(12) United States Patent
Goto

(10) Patent No.: US 8,977,850 B2
(45) Date of Patent: Mar. 10, 2015

(54) CONTENT DATA, TRANSMITTING APPARATUS, RECEIVING APPARATUS AND DECODING METHOD

(75) Inventor: Ryo Goto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1204 days.

(21) Appl. No.: 12/305,852

(22) PCT Filed: Jun. 28, 2007

(86) PCT No.: PCT/JP2007/063040
§ 371 (c)(1),
(2), (4) Date: Jun. 8, 2010

(87) PCT Pub. No.: WO2008/001867
PCT Pub. Date: Jan. 3, 2008

(65) Prior Publication Data
US 2010/0250928 A1 Sep. 30, 2010

(30) Foreign Application Priority Data

Jun. 29, 2006 (JP) ................................. 2006-179607

(51) Int. Cl.
*H04L 9/32* (2006.01)
*H04L 9/06* (2006.01)
(Continued)

(52) U.S. Cl.
CPC ................ *H04L 9/065* (2013.01); *H04L 9/088* (2013.01); *H04L 63/04* (2013.01); *H04L 2209/12* (2013.01); *H04L 2209/34* (2013.01); *H04L 2209/601* (2013.01)
USPC ......................................... 713/168; 380/225

(58) Field of Classification Search
CPC ........................ H04L 9/00; H04L 9/06; H04L 9/0618–9/0637; H04L 9/065; H04L 9/088; H04L 2209/00; H04L 2209/12; H04L 2209/24; H04L 2209/34; H04L 63/04; H04L 63/0428; H04L 63/0457; H04L 63/068
USPC .......... 713/168, 150, 160, 171; 726/262, 274, 726/35, 37, 42; 380/210, 221, 225, 255, 380/277–280, 283–285
See application file for complete search history.

(56) References Cited

U.S. PATENT DOCUMENTS 4,613,901 A * 9/1986 Gilhousen et al. ............ 380/239
7,274,792 B2 * 9/2007 Chin et al. .................... 380/262
(Continued)

FOREIGN PATENT DOCUMENTS

CN 1631038 A 6/2005
JP 60-057783 4/1985
(Continued)

OTHER PUBLICATIONS

Korean language office action and its English language translation for corresponding Korean application 1020087031548.
(Continued)

*Primary Examiner* — Saleh Najjar
*Assistant Examiner* — Eric W Shepperd
(74) *Attorney, Agent, or Firm* — Studebaker & Brackett PC

(57) ABSTRACT

A transmitting apparatus comprises an initialization vector generating unit for generating an initialization vector, an encryption unit for initializing a stream encryption module using the generated initialization vector and performing stream encryption on stream data using the initialized stream encryption module, an encryption packet generating unit for generating an encryption packet containing encrypted stream-encrypted data, an initialization packet generating unit for generating an initialization packet containing an initialization vector and time information indicating when a next initialization vector subsequent to the initialization vector will be sent, and a transmission unit for transmitting the initialization packet and the encryption packet by broadcast/multicast.

3 Claims, 7 Drawing Sheets

(51) Int. Cl.
*H04L 9/08* (2006.01)
*H04L 29/06* (2006.01)

(56) References Cited

U.S. PATENT DOCUMENTS

| | | | |
|---|---|---|---|
| 7,369,662 B2* | 5/2008 | Relander et al. | 380/261 |
| 7,474,749 B2* | 1/2009 | Mauro | 380/255 |
| 7,477,743 B2 | 1/2009 | Hakkarainen et al. | |
| 7,496,631 B2* | 2/2009 | Austin-Lane et al. | 709/206 |
| 7,590,237 B2* | 9/2009 | Krause et al. | 380/37 |
| 7,636,439 B2 | 12/2009 | Nakabayashi et al. | |
| 7,953,224 B2* | 5/2011 | Zhu et al. | 380/217 |
| 8,122,119 B1* | 2/2012 | Green et al. | 709/224 |
| 2001/0030963 A1* | 10/2001 | Yoshimura et al. | 370/393 |
| 2001/0034755 A1* | 10/2001 | Aizono et al. | 709/201 |
| 2003/0039361 A1* | 2/2003 | Hawkes et al. | 380/278 |
| 2003/0147532 A1* | 8/2003 | Hakkarainen et al. | 380/239 |
| 2004/0158534 A1* | 8/2004 | Zahir Azami et al. | 705/75 |
| 2004/0194143 A1 | 9/2004 | Hirose | |
| 2005/0210242 A1* | 9/2005 | Troxel et al. | 713/160 |
| 2006/0056625 A1* | 3/2006 | Nakabayashi et al. | 380/46 |

FOREIGN PATENT DOCUMENTS

| | | |
|---|---|---|
| JP | 06-075524 | 3/1994 |
| JP | 2002-026963 | 1/2002 |
| JP | 2004289588 A | 10/2004 |
| JP | 2004-336392 | 11/2004 |
| JP | 2006-109428 | 4/2006 |

OTHER PUBLICATIONS

Chinese language office action dated Oct. 19, 2011 and its English language translation for corresponding Chinese application 200780024637.2.
Chinese language office action dated Jun. 30, 2011 and its English language translation for corresponding Chinese application 200780024637.2.
Chinese language office action dated Oct. 29, 2010 and its English language translation for corresponding Chinese application 200780024637.2.
Japanese language office action dated Nov. 8, 2011 and its English language translation for corresponding Japanese application 2006179607.
Japanese language office action dated Aug. 9, 2011 and its English language translation for corresponding Japanese application 2006179607.
Chinese language office action dated Mar. 7, 2012 and its English language translation issued in corresponding Chinese application 2007800246371.
Japanese language office action dated Jun. 18, 2013 and its English language translation issued in corresponding Japanese application 2012024905.

* cited by examiner

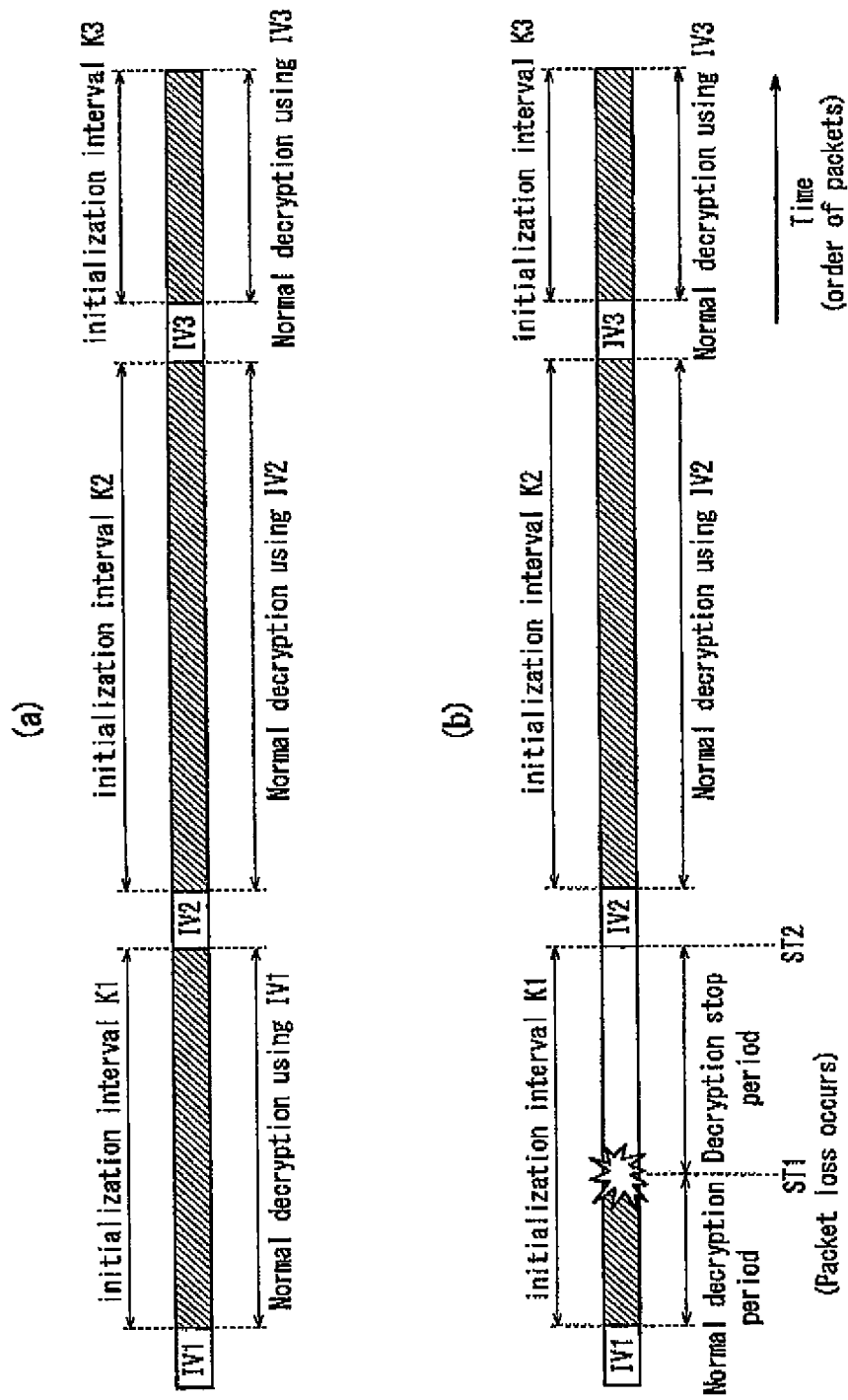

CONTENT DATA, TRANSMITTING APPARATUS, RECEIVING APPARATUS AND DECODING METHOD

CROSS REFERENCE TO RELATED APPLICATION

This application claims priority to and the benefit of Japanese Patent Application No. 2006-179607 filed on Jun. 29, 2006, the entire content of which is incorporated herein by reference.

FIELD OF THE INVENTION

The present invention relates to content data, a transmitting apparatus, a receiving apparatus and a decoding method, and more specifically, to a technique improving resilience against transmission/reception errors of packets encrypted with stream encryption method and transmitted by broadcast/multicast.

DESCRIPTION OF THE RELATED ART

Conventional encryption methods can be classified roughly into a block encryption method, which encrypts plaintext on the block basis, and a stream encryption method, which encrypts plaintext by one bit (or some bits). The stream encryption method can be embodied with simple algorithm, which allows high speed signal processing. Therefore, the stream encryption method can be easily implemented in an apparatus with low computation throughput such as cell phones, STBs (Set Top Boxes), PDAs (Personal digital Assistants) and the like. In addition, as processing plaintext by one bit without delay, the stream encryption method is suitable to encrypt data for communication or broadcasting. For such stream encryption method, techniques for improving security of encrypted data have been mainly developed. For example, there has been suggested an encryption method that increases randomness in key stream generation in order to be robust and secure against attacks (see Japanese Patent Application Laid Open No. H6-75524 (paragraphs 0009-0016 and FIG. 1)).

DISCLOSURE OF THE INVENTION

Problems to be Solved by the Invention

As described above, conventional stream encryption techniques are mainly to improve resilience against attacks, so that it has been late to develop techniques for improving resilience against errors on a transmission path such as packet loss. Specifically, on the radio transmission path of broadcast/multicast, since packet retransmission is not performed even though probability of packet loss is highly increased, damage becomes large when errors occur. Therefore, techniques for improving error resilience have been required.

The stream encryption methods are classified into an external-synchronizing stream encryption method and an internal-synchronizing stream encryption method. FIG. 6 is a block diagram illustrating a conventional external-synchronizing stream encryption method. As shown in FIG. 6, the external-synchronizing stream encryption method can generate a key stream without depending on ciphertext or the like. When a bit error occurs, only the corresponding bits become the error, so that in subsequent processes decryption can be performed without being affected. When such external-synchronizing stream encryption method is employed in communication/broadcast, a receiver needs to receive regularly initial values (hereinafter referred to as "initialization vector") that a transmitter used for encryption, and generate a key stream by initializing an encryption module (in stream encryption method, the encryption module is the same as decryption module) with the initialization vector. In a case where the initialization packet is lost, the receiver cannot perform decryption until an initialization packet containing a new initialization vector is acquired.

FIG. 7 is a timing chart illustrating a conventional process for initialization packet loss in broadcasting data including stream-encrypted data. As shown, when initialization intervals K1, K2 and K3 are variable without being fixed (variable-length initialization timing), the receiver cannot predict when an initialization packet is transmitted, so that it cannot recognize which packet is the initialization packet. Therefore, in order to prevent decrypting ciphertext incorrectly in wrong decryption processes, subsequent decryption processes are stopped until a new initialization packet is received.

For example, FIG. 7(a) shows a case of normal decryption (normal reception) when there is no packet loss. In the initialization interval K1 of an initialization vector IV1, a shifter is initialized based on the IV1 and an encryption key. A key stream generating unit generates a key stream from content of the shifter and decrypts encrypted packets by performing XOR on the generated "key stream" and "encryption packet data". Similar decryptions are performed respectively during initialization intervals K2, K3 with initialization vectors IV2, IV3.

FIG. 7(b) shows a case that packet loss (reception errors) occurs. As shown, packet loss occurs at time ST1 in the initialization interval K1. Within the period from the time ST1 to the time ST2 at which a packet containing a new initialization vector IV2 is arrived, decryption is stopped in order to prevent decrypting plaintext incorrectly in wrong decryption processes. And, after the packet containing a new initialization vector IV2 is received, decryption is restarted as usual. In such processing method for packet loss, for example, when an important frame (I frame of MPEG) or the like of image data is arranged within the decryption stop period, there are problems in that following images to be reconstructed based on the important frame can not be reproduced.

In conventional communication, since cable transmission paths are mainly used, frequency of packet loss is extremely low, and even though packet loss occurs, it is easy to recover lost packets by retransmitting packets or the like. However, in a communication/broadcast system in which retransmission is not performed basically such as general broadcast/multicast, it is difficult to recover lost packets. As radio technology is developed, there are many cases in that a radio transmission path is used as a transmission path of broadcast/multicast (typically, one segment broadcasting for a cell phone), and therefore frequency of packet loss is considerably increased as compared with cable transmission path.

An object of the present invention is to provide a steam encryption technique (data, apparatus, method and the like) that improves error resilience when packet loss (reception errors) occurs.

Means for Solving the Problem

To achieve the above object, content data (data structure) according to the present invention are content data (data such as program of digital broadcasting or the like) encrypted with a stream encryption method and transmitted by broadcast/multicast, and comprise:

at least, an initialization packet containing an initialization vector used when stream data was encrypted; and an encryption packet containing stream-encrypted data encrypted by using the initialization vector,
wherein the initialization packet further contains time information (time based on PCR, relative time such as what time (ms) later, absolute time or the like) indicating when a next initialization packet will be sent.

A transmitting apparatus (encoding apparatus) according to one embodiment of the present invention comprises:
an initialization vector generating unit (pseudorandom number generator) for generating an initialization vector for encrypting stream data with a stream encryption method;
an encryption unit (CPU operating and executing a stream encryption module or the like) for initializing a stream encryption module (hardware module, software module, or module which combines these) using the initialization vector generated by the initialization vector generating unit, and performing stream encryption on the stream data using the stream encryption module initialized;
an encryption packet generating unit for generating an encryption packet containing stream-encrypted data encrypted by the encryption unit;
an initialization packet generating unit for generating an initialization packet containing the initialization vector and time information indicating when a next initialization vector of the initialization vector will be sent; and
a transmission unit for transmitting the initialization packet and the encryption packet by broadcast/multicast.

A receiving apparatus (decoding apparatus) according to another embodiment of the present invention comprises:
a reception unit (reception circuit or the like) for receiving an initialization packet containing an initialization vector for encrypting stream data and time information indicating when a next initialization vector of the initialization vector will be sent, and an encryption packet containing stream-encrypted data encrypted (in an external transmitting apparatus) using the initialization vector;
a decryption unit (circuit, CPU executing the encryption module, or the like) for initializing a stream encryption (decryption) module using the initialization vector contained in the initialization packet, and decrypting stream-encrypted data contained in the encryption packet;
a detection unit for detecting a reception error of a packet received by the reception unit; and
a control unit (circuit or the like) for controlling the decryption unit so as to continuously decrypt the stream-encrypted data when a timing at which the detection unit detects a reception error of a packet is before a predetermined range defined based on a time at which the next initialization vector will be sent, and so as to stop decrypting the stream-encrypted data until a new initialization packet is received when the timing is within the predetermined range.

A receiving apparatus (decoding apparatus) according to yet another embodiment of the present invention, comprises:
a reception unit for receiving an initialization packet containing an initialization vector for encrypting stream data, a next initialization vector of the initialization vector and time information indicating when the next initialization vector is scheduled to be sent, and an encryption packet containing stream-encrypted data encrypted using the initialization vector (which are transmitted from an external transmission apparatus);
a decryption unit for initializing a stream encryption (decryption) module using the initialization vector contained in the initialization packet, and decrypting stream-encrypted data contained in the encryption packet;
a detection unit for detecting a reception error of a packet received by the reception unit; and
a control unit for controlling the decryption unit so as to continuously decrypt the stream-encrypted data when a timing at which the detection unit detects a reception error of a packet is before a predetermined range defined based on a time at which the next initialization vector will be sent, and so as to initialize the stream encryption module using the next initialization vector and decrypt stream-encrypted data contained in an encryption packet received after the timing at which the reception error is detected using the initialized stream encryption module when the timing is within the determined range.

A decoding method according to still another embodiment of the present invention comprises:
receiving step for receiving an initialization packet containing an initialization vector for encrypting stream data and time information indicating when a next initialization vector of the initialization vector will be sent, and an encryption packet containing stream-encrypted data encrypted (in an external transmitting apparatus) using the initialization vector with a receiver;
decrypting step for initializing a stream encryption (decryption) module using the initialization vector contained in the initialization packet and decrypting stream-encrypted data contained in the encryption packet with the stream encryption module;
detecting step for detecting a reception error of a packet received in the receiving step (by a detection unit); and
controlling step for controlling the decryption step so as to continuously decrypt the stream-encrypted data when a timing at which a reception error of a packet is detected in the detecting step is before a predetermined range defined based on a time at which the next initialization vector will be sent, and so as to stop decrypting the stream-encrypted data until a new initialization packet is received when the timing is within the predetermined range.

As described above, solving means of the present invention are described as data, apparatus and method, but the present invention can be embodied with another type of constitution (in other words, data structure, method, program and recording medium recording the program) corresponding these substantially. Therefore, it will be understood that these are included within the scope of the present invention.

Effect of the Invention

According to the present invention, it is possible to provide and reproduce contents (program) with high quality by improving error resilience when encryption packet loss occurs in general broadcast/multicast in which packet retransmission is not performed. Specifically, in broadcast/multicast using radio transmission paths in which probability of packet loss is notably increased, it is possible to minimize damage by errors and improve error resilience considerably.

BRIEF DESCRIPTION OF THE DRAWINGS

FIG. 7 is a timing chart illustrating a conventional process for initialization packet loss in broadcasting data including stream-encrypted data.

BEST MODE FOR CARRYING OUT THE INVENTION

Figure 1:
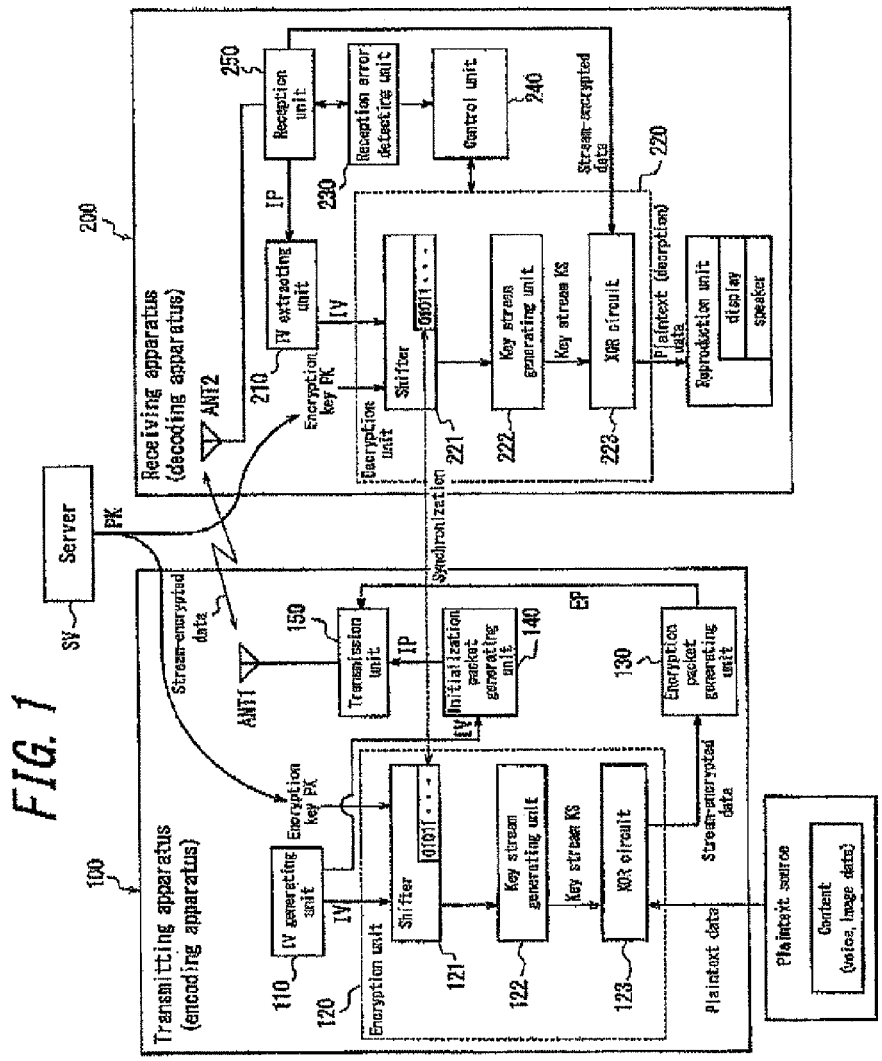
FIG. 1 is a block diagram illustrating a stream encryption communication system comprising a transmitting apparatus (encoding apparatus) and a receiving apparatus (decoding apparatus) according to the present invention.

Preferred embodiments of the present invention will now be described with reference to the accompanying drawings. FIG. 1 is a block diagram illustrating a stream encryption communication system comprising a transmitting apparatus (encoding apparatus) and a receiving apparatus (decoding apparatus) according to the present invention. As shown in FIG. 1, the stream encryption communication system according to the present invention comprises a transmitting apparatus (encoding apparatus) 100 and a receiving apparatus (decoding apparatus) 200.

<Constitution of the Transmitting Apparatus (Encoding Apparatus)>

The transmitting apparatus 100 has an initialization vector (IV) generating unit 110, an encryption unit 120, an encryption packet generating unit 130, an initialization packet generating unit 140, a transmission unit 150 and an antenna ANT1. The encryption unit 120 has a shifter (LFSR: Linear Feedback Shift Register) 121, a key stream generating unit 122 and an XOR (exclusive OR operation) circuit 123. The initialization vector generating unit 110 generates initialization vectors IV irregularly. The shifter (LFSR) 121 is initialized based on the initialization vector IV and an encryption key (public key) PK provided by external server SV or the like. The key stream generating unit 122 generates a key stream KS from content of the shifter (LFSR), and provides it to the XOR circuit 123. After that, the shifter (LFSR) 121 performs a shift operation based on steam encryption algorithm. The XOR circuit 123 converts plaintext data into stream-encrypted data by performing XOR on the key stream KS and plaintext data acquired from plaintext source (program contents data and the like). Such shift operation and XOR calculation are continued until the initialization vector is changed. When the initialization vector is changed, the encryption unit (in other words, encryption algorithm (module)) is initialized, a new key stream KS is generated, and the processes above described are repeated.

The XOR circuit 123 provides stream-encrypted data to the encryption packet generating unit 130, and the encryption packet generating unit 130 makes an encryption packet EP by adding a header and the like to the provided stream-encrypted data. The encryption packet made by the encryption packet generating unit 130 is transmitted to the transmission unit 150. The initialization packet generating unit 140 generates an initialization packet IP containing an initialization vector IV used when stream data were encrypted and time information indicating when a next initialization vector IV_next of the initialization vector IV will be sent, and provides it to the transmission unit 150. The transmission unit 150 receives the initialization packet IP and the encryption packet EP, and generates a packet stream (transport stream) constructed with these packets. Current initialization packet IP_current contains time information indicating when the next initialization packet IP_next containing the next initialization vector IV_next will be sent. When a decryption period in which decryption is performed with the next initialization vector IV_next is significant, or the like, the initialization packet IP further contains the next initialization vector IV_next. Therefore, even though the next initialization packet IP_next is lost, the receiving apparatus can reproduce contents (program) normally by performing initialization using IV_next contained in the previous initialization packet IP_current and decrypting packet in the significant period normally. After several processes such as demodulation, multiplex, and the like are performed on the packet stream, the packet stream is transmitted (broadcasted) through the antenna ANT 1. The transmitting apparatus further has a modulator, a multiplexer for multiplexing audio, image, data, etc., and the like which are not shown.

<Constitution of the Receiving Apparatus (Decoding Apparatus)>

The receiving apparatus 200 has an initialization vector (IV) extracting unit 210, a decryption unit 220, a reception error detecting unit 230, a control unit 240, a reception unit 250 and an antenna ANT2. The decryption unit 220 has a shifter (LFSR: Linear Feedback Shift Register) 221, a key stream generating unit 222 and an XOR (exclusive OR operation) circuit 223. In addition, the receiving apparatus has a demodulator, a demultiplexer and the like, which are not shown. In the stream encryption method, since the same algorithm can be used as encryption algorithm (i.e. encryption module) used in encryption and as decryption algorithm (i.e. decryption module) used in decryption, decryption algorithm and decryption module may be referred to as encryption algorithm.

The initialization vector extracting unit 210 extracts an initialization vector IV from an initialization packet IP acquired by the reception unit 250, and provides it to the shifter (LFSR) 221. The shifter (LFSR) 221 is initialized based on the extracted initialization vector IV and an encryption key (public key) PK from an external server SV or the like. The key stream generating unit 222 generates a key stream KS from content of the shifter and provides it to the XOR circuit 223. And then, the shifter (LFSR) 221 performs a shift operation based on stream encryption algorithm. The XOR circuit 223 converts (decrypts) stream-encrypted data into plaintext data by performing XOR between the key stream KS and stream-encrypted data acquired by the reception unit 250. Such shift operation and XOR calculation are continued until the initialization vector IV is changed. When the initialization vector IV is changed, a new key stream KS is generated by the decryption unit (i.e. decryption algorithm (module)) being initialized, and above-described processes are repeated. In this way, decryption processes are performed with synchronizing correlation state between the shifter of the decryption unit at the receiving apparatus side and plaintext data with correlation state between the shifter of the encryption unit at the transmitting apparatus side and encrypted data. When this synchronization is lost, decryption cannot be performed correctly. Regarding this, it will be described below.

<Solution for Synchronization Deviation>

A method for solving the synchronization deviation will be described. When there is a packet loss at the receiving (decoding) side, deviation between state of the shift register and state of the shift register at the encryption module side, which is so-called "synchronization deviation", occurs as much as the lost bits. When the synchronization deviation occurs, encrypted data cannot be decrypted accurately, and wrong plaintext is decrypted and generated. In the header of transport stream (TS) packet, a continuity marker (Continuity_Counter) is inserted. This continuity marker is a 4-bit counter that is increased by one in the same PID. At the receiving side, the number of packets related to the packet loss can be detected by detecting discontinuity of the counter. The continuity marker is increased by one each TS packet in each elementary stream. Thus, for example, when an elementary stream to be encrypted is a video stream, it is not applied to audio packets or null packets, so that a continuity marker of video stream is not increased.

For example, in case of a TS stream whose adaptation field control value is "01", since a packet has a fixed length of 188 bytes (4 bytes for a header and 184 bytes for payload), the total number of lost bits which affects synchronization of the shifter can be derived as follows:

The total number of lost bits=the number of lost packets×184×8

If a key stream stored in the shifter when en error occurred is shifted by the total number of lost bits derived by the number of lost packets, it is possible to "re-synchronize" state of the shifter at the receiving (decoding) side to state of the shifter at the encoding (transmitting) side. In other words, the decryption process can be restarted by solving the synchronization deviation using information (for example, continuity marker and packet length data) by which the total number of lost bits included in lost packets can be detected.

Figure 2:
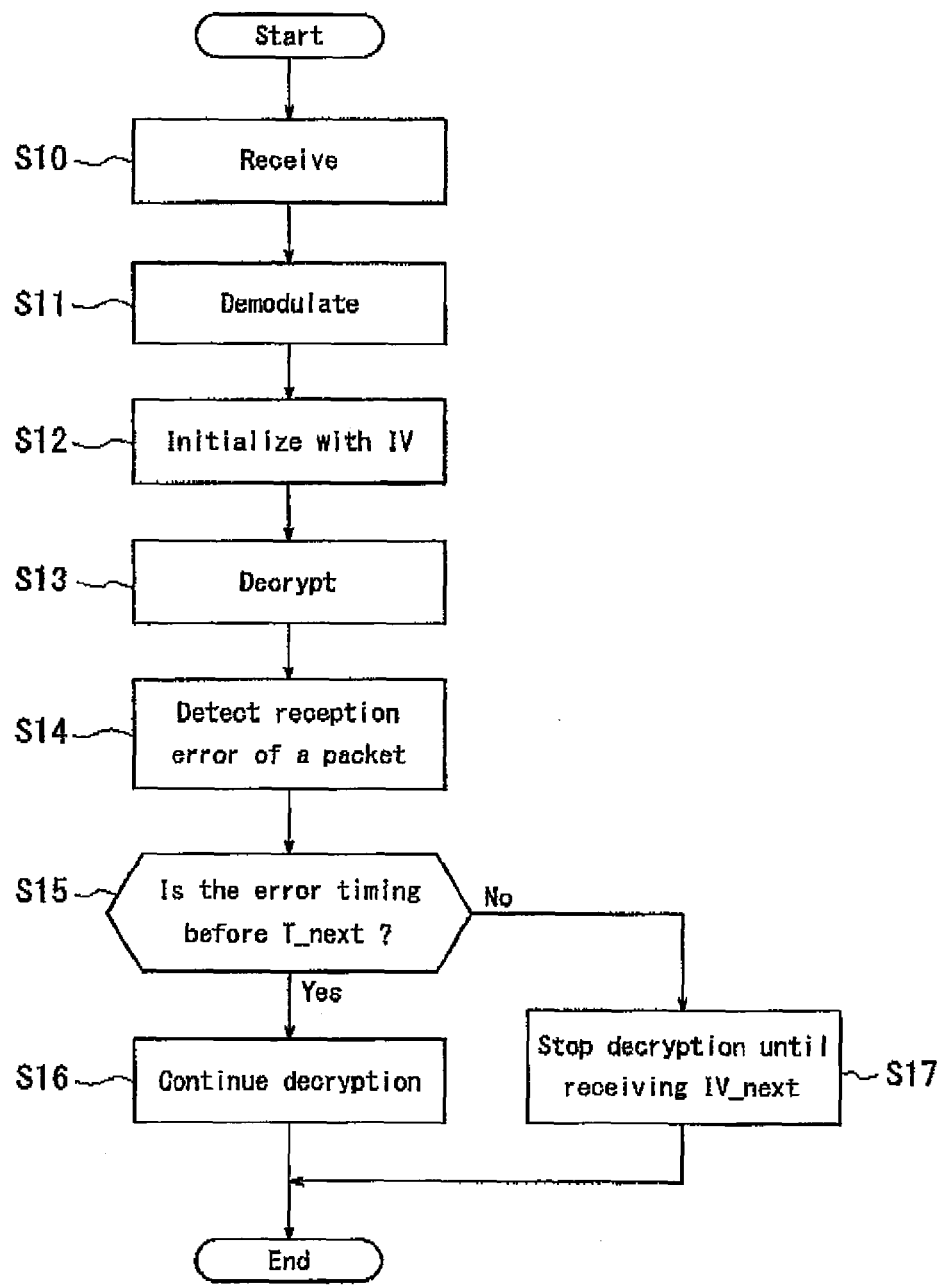
FIG. 2 is a flow chart illustrating a recovery process of receiving apparatus (decoding apparatus) according to the present invention when there is packet loss.

FIG. 2 is a flow chart illustrating a recovery process of the receiving apparatus (decoding apparatus) according to the present invention when there is packet loss. As shown in FIG. 2, at step S10, the receiving apparatus receives carriers (modulated waves) carrying an initialization packet IP containing an initialization vector IV_current for encrypting stream data, and time information T_next indicating when the next initialization vector IV_next of the initialization vector will be sent; and an encryption packet EP containing stream-encrypted data which are encrypted with the initialization vector. And then, the received carriers are demodulated, and TS packets including the initialization packet IP and a series of encryption packets EP containing stream-encrypted data encrypted using the initialization vector IV are acquired (S11). In one segment broadcasting for a cell phone, TS packets are generally de-multiplexed into packets of audio information, image information and data broadcasting information, and are provided to an audio decoding unit, an image decoding unit, and data decoding unit, respectively.

Next, stream encryption module is initialized by using the initialization vector IV_current contained in the initialization packet IP (S12), and stream-encrypted data contained in the encryption packets EP are decrypted (S13). When receiving packets, the receiving apparatus always detects a reception error (packet loss) of packets being received with Reed Solomon codes or the like (S14). The receiving apparatus determines whether the timing at which a reception error of packets is detected is before the time T_next (or a predetermined range defined based on the time T_next) at which the next initialization vector IV_next (i.e., next initialization packet) will be sent (S15). When it is before the time T_next, stream-encrypted data are continuously decrypted (S16). Otherwise, decrypting the stream-encrypted data is stopped until a new initialization packet is received (S17).

Figure 3:
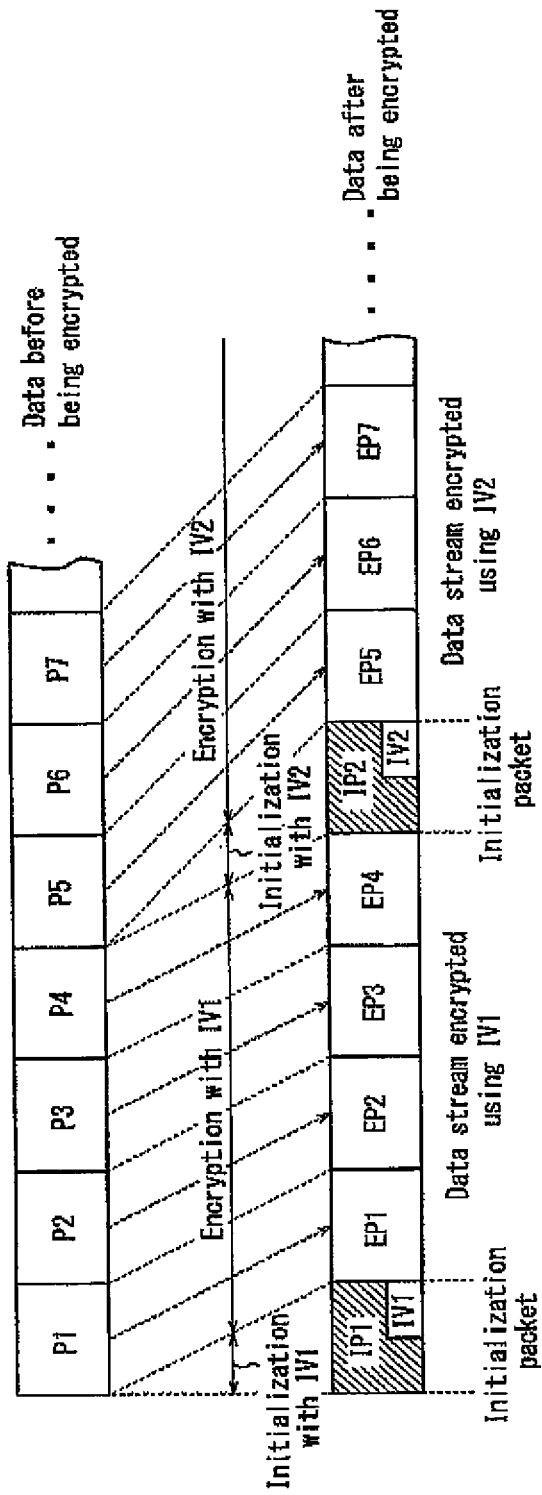
FIG. 3 shows general packet arrangement when a packet group (data stream) is encrypted with stream encryption method.

FIG. 3 shows general packet arrangement when a packet group (data stream) is encrypted with a stream encryption method. As shown, there are plaintext packets P1~P7 including data before encryption. When plaintext packets P1~P41 are encrypted with stream encryption algorithm initialized with the initialization vector IV1, the plaintext packets P1~P4 are converted into encryption packets EP1~EP4, respectively. An initialization packet IP1 containing the initialization vector IV1 is arranged before a series of encryption packets EP1~EP4 encrypted using the initialization vector IV1. Similarly, following data are encrypted, and an initialization packet IP2 containing an initialization vector IV2 is arranged between a series of encryption packets EP5~EP7 encrypted with the initialization vector IV2 and a preceding series of encryption packets EP1~EP4. In the present invention, additional information is further contained in the initialization packet IP in order to improve error (packet loss) resilience.

Figure 4:
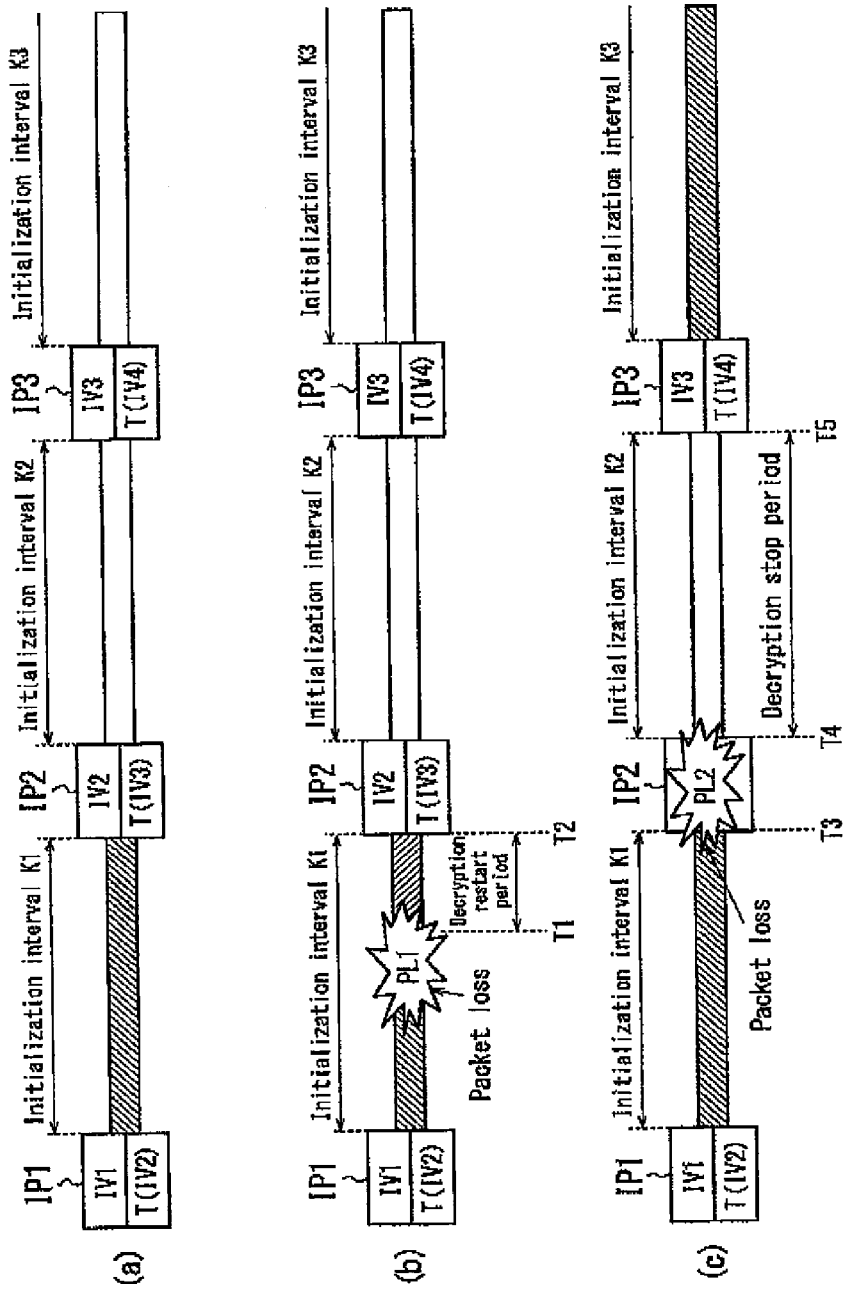
FIG. 4 is a timing chart illustrating a recovery process of the receiving apparatus (decoding apparatus) according to the present invention when packet loss is detected.

FIG. 4 is a timing chart illustrating a recovery process of the receiving apparatus (decoding apparatus) according to the present invention when packet loss is detected. As shown in FIGS. 4(a), (b) and (c), the initialization packet IP1 contains a current initialization vector IV1 and time information T(IV2) indicating when the next initialization vector will be sent. Similarly, the initialization packet IP2 contains a current initialization vector IV2 and time information T(IV3) indicating when the next initialization vector will be sent, and the initialization packet IP3 contains a current initialization vector IV3 and time information T(IV4) indicating when the next initialization vector will be sent. FIG. 4(a) shows a decryption recovery process when reception is normally performed without packet loss. When receiving the initialization packet IP1, the receiving apparatus performs the initialization process using the initialization packet IP1, and decrypts following encryption packets EP received in the initialization interval K1.

<Decryption Recovery Process for Encryption Packet Loss>

FIG. 4(b) shows a decryption recovery process when packet loss PL1 occurs in the initialization interval K1. As shown, the packet loss PL1 occurs within the initialization interval K1. The receiving apparatus compares a scheduled arrival time T_arrival defined by the time information T(IV2) indicating when the next initialization vector will be sent and contained in the initialization packet IP1 which has been received, and the timing of packet loss. When the timing of packet loss is before the scheduled arrival time T_arrival, the receiving apparatus restarts decryption from the time T1 at which reception is normally performed. Therefore, according to the present invention, it is possible to decrypt packets received in the decryption restart period [T1-T2], which could not be recovered in the past.

<Decryption Recovery Process for Initialization Packet Loss>

FIG. 4(c) shows a decryption recovery process when packet loss PL2 of an initialization packet IP2 occurs. As shown, packet loss PL2 occurs at scheduled arrival time of the initialization packet IP2. The receiving apparatus compares a scheduled arrival time zone T_arrival_zone[T3-T4] defined by time information T(IV2) indicating when a next initialization packet will be sent and contained in the initialization packet IP1 which has been received, and a timing of the packet loss PL2. When the scheduled arrival time zone T_arrival_zone coincides roughly with the timing of the packet loss PL2, since the initialization vector IV2 cannot be acquired, the receiving apparatus sets the initialization interval K2 as a decryption stop period [T4-T5], and stops performing decryption in the period. And, decryption is restarted after the initialization packet IP3 is received normally. In here, the scheduled arrival time zone T_arrival_zone is determined by considering delay time in various apparatus and processes such as a multiplexing process at transmitting apparatus side, a demultiplexing (packet demultiplexing)

process at the receiving apparatus side, and a process in a wireless period as well as the time information indicating when the next initialization vector will be sent.

Figure 5:
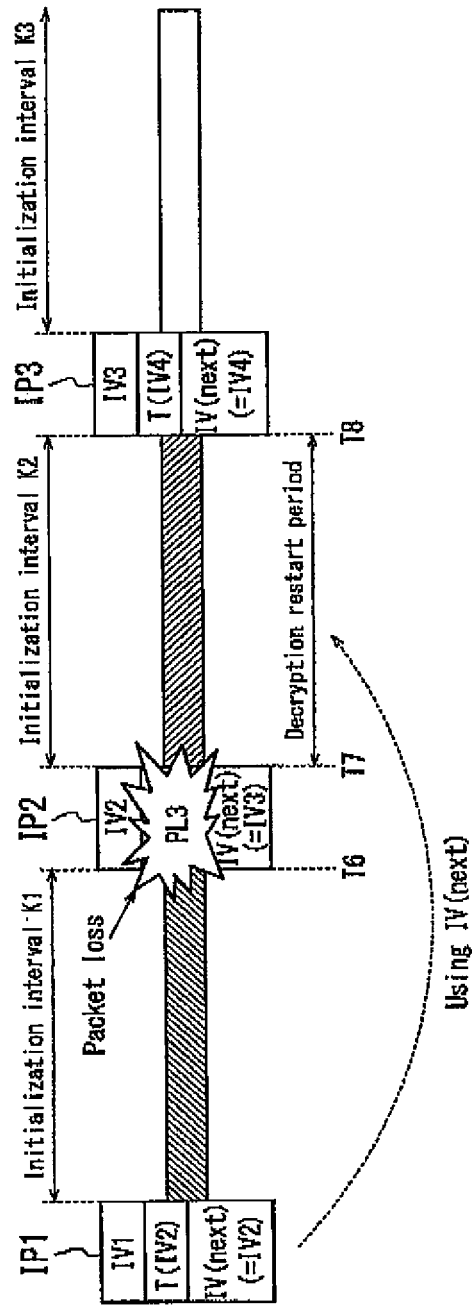
FIG. 5 shows a decryption recovery process when packet loss PL3 of the initialization packet IP2 occurs.
Figure 6:
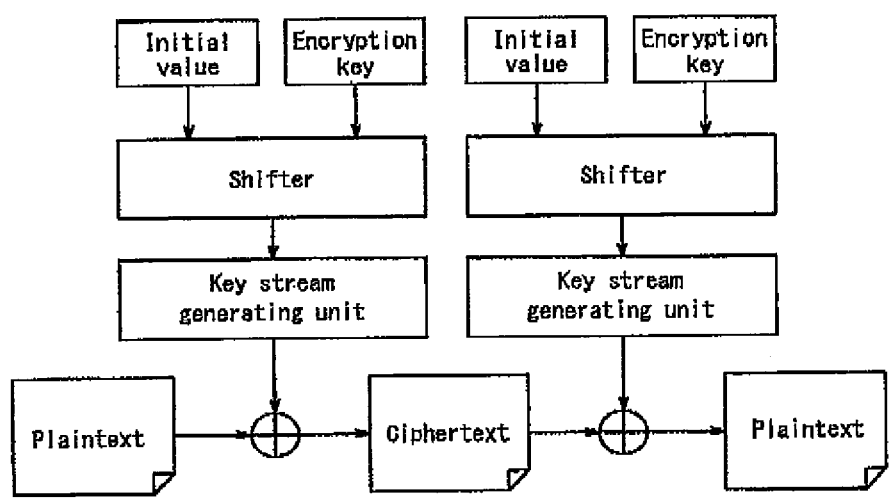
FIG. 6 is a block diagram illustrating a conventional external-synchronizing stream encryption method.

FIG. 5 shows a decryption recovery process when packet loss PL3 of the initialization packet IP2 occurs. As shown, packet loss PL3 occurs at the scheduled arrival time of the initialization packet IP2. In here, the initialization packet further contains the next initialization vector IV(next). For example, the initialization packet IP1 contains the current initialization vector IV1 and the next initialization vector IV2. The receiving apparatus compares a scheduled arrival time zone T_arrival_zone[T6-T7] defined by time information T(IV2) indicating when a next initialization vector will be sent and contained in the initialization packet IP1 which has been received, and a timing of packet loss PL3. When the scheduled arrival time T_arrival coincides roughly with the timing of packet loss PL3, the receiving apparatus performs the initialization process using the next initialization vector IV2 contained in the initialization packet IP1, which has been already received. And, it sets the initialization interval K2 as a decryption recovery period [T7-T8], and restarts decryption in the period.

The present invention is widely applicable to apparatus using stream encryption in communication/broadcast in which retransmission is not basically performed such as general broadcast/multicast and the like. Specifically, the present invention can be employed in broadcasting apparatus for one segment broadcasting, cell phones or PDAs having broadcast reception function for one segment broadcasting, and the like. Since the cell phone moves continuously with a user, reception condition through a radio transmission path is likely to be poor, and therefore frequency of packet loss is increased. However, the present invention improves error resilience, so that it is possible to provide a user with good circumstance for watching broadcast/multicast.

While the invention has been described with reference to exemplary embodiments and drawings, it will be understood by those skilled in the art that many various modifications and extensions of the above-described technology may be implemented using the teaching of this invention. All such modifications and extensions are intended to be included within the true spirit and scope of the present invention. For example, functions included in each unit, step and the like can be rearranged not to be contradictory logically. And, a plurality of unit, steps and the like can be combined or divided. For example, in the embodiment, encryption packets and initialization packets are generated after encryption, but in MPEG2 or the like, only PES may be encrypted by being extracted from a converted packet into PES (Packetized Elementary Stream) format, PS format (pack packetization), or TS (Transport stream) format (TS packetization). In addition, in the embodiment, while packets of transport stream (TS) format is exemplarily explained, it is possible to apply the present invention into program stream (PS) packet if the total number of lost bits can be calculated by setting length of payload in each packet to fixed length.

The invention claimed is:

1. A transmitting apparatus comprising:
an initialization vector generating circuit configured to generate an initialization vector for encrypting stream data with a stream encryption method;
an encryption circuit configured to initialize a stream encryption module using the initialization vector generated by the initialization vector generating circuit, and performing stream encryption on the stream data using the stream encryption module initialized;
an encryption packet generating circuit configured to generate an encryption packet containing stream-encrypted data encrypted by the encryption circuit;
an initialization packet generating circuit configured to generate an initialization packet containing the initialization vector, the initialization packet containing the initialization vector further containing time information indicating when a next initialization vector subsequent to the initialization vector will be sent; and
a transmitter configured to transmit the initialization packet and the encryption packet by broadcast/multicast.

2. A receiving apparatus comprising:
a reception circuit configured to receive an initialization packet containing an initialization vector for encrypting stream data, the initialization packet containing the initialization vector further containing time information indicating when a next initialization vector subsequent to the initialization vector will be sent, and an encryption packet containing stream-encrypted data encrypted using the initialization vector;
a decryption circuit configured to initialize a stream encryption module using the initialization vector contained in the initialization packet, and decrypting stream-encrypted data contained in the encryption packet;
a detection circuit configured to detect a reception error of a packet received by the reception circuit; and
a control circuit configured to control the decryption circuit so as to continuously decrypt the stream-encrypted data when a timing at which the detection circuit detects a reception error of a packet is before a predetermined range defined based on a time at which the next initialization vector will be sent, and so as to stop decrypting the stream-encrypted data until a new initialization packet is received when the timing is within the predetermined range.

3. A decoding method comprising:
receiving an initialization packet containing an initialization vector for encrypting stream data, the initialization packet containing the initialization vector further containing time information indicating when a next initialization vector subsequent to the initialization vector will be sent, and an encryption packet containing stream-encrypted data encrypted using the initialization vector with a receiver;
initializing a stream encryption hardware module using the initialization vector contained in the initialization packet and decrypting stream-encrypted data contained in the encryption packet with the stream encryption hardware module;
detecting a reception error of a packet received in the received initialization packet and encryption packet; and
controlling the decryption of the stream-encrypted data so as to continuously decrypt the stream-encrypted data when a timing at which a reception error of a packet is detected is before a predetermined range defined based on a time at which the next initialization vector will be sent, and so as to stop decrypting the stream-encrypted data until a new initialization packet is received when the timing is within the predetermined range.

* * * * *